(12) United States Patent
Dintenfass et al.

(10) Patent No.: US 11,968,130 B2
(45) Date of Patent: Apr. 23, 2024

(54) REAL-TIME ADJUSTMENT OF RESOURCE ALLOCATION BASED ON USAGE MAPPING VIA AN ARTIFICIAL INTELLIGENCE ENGINE

(71) Applicant: BANK OF AMERICA CORPORATION, Charlotte, NC (US)

(72) Inventors: Katherine Kei-Zen Dintenfass, Lincoln, RI (US); Jinna Zevulun Kim, Charlotte, NC (US); Jennifer Tiffany Renckert, Middleburg, FL (US); Vijaya L. Vemireddy, Plano, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 17/898,933

(22) Filed: Aug. 30, 2022

(65) Prior Publication Data
US 2024/0073154 A1 Feb. 29, 2024

(51) Int. Cl.
*H04L 47/78* (2022.01)
*G06Q 20/40* (2012.01)
*H04L 47/70* (2022.01)
*H04L 47/80* (2022.01)
*G06Q 10/04* (2023.01)

(52) U.S. Cl.
CPC ....... *H04L 47/781* (2013.01); *G06Q 20/4016* (2013.01); *G06Q 20/405* (2013.01); *H04L 47/801* (2013.01); *H04L 47/822* (2013.01); *G06Q 10/04* (2013.01)

(58) Field of Classification Search
CPC ..... H04L 47/70; H04L 47/801; H04L 47/781; H04L 47/822; H04L 47/823; G06Q 20/4016; G06Q 20/405; G06Q 10/04
See application file for complete search history.

(56) References Cited

U.S. PATENT DOCUMENTS

| | | | |
|---|---|---|---|
| 8,984,047 B2 | 3/2015 | Gassewitz et al. |
| 9,313,159 B2 | 4/2016 | Ross |
| 9,549,017 B2 | 1/2017 | Zhang et al. |
| 9,648,068 B1 | 5/2017 | Narsude et al. |
| 10,142,276 B2 | 11/2018 | Rapaport et al. |

(Continued)

*Primary Examiner* — Jeong S Park
(74) *Attorney, Agent, or Firm* — Moore & Van Allen PLLC; Gabrielle M. Carlini

(57) ABSTRACT

Systems, computer program products, and methods are described herein for real-time adjustment of resource allocation based on usage mapping via an artificial intelligence engine. The present invention is configured to receive a data transmission from a plurality of user devices, wherein the data transmission comprises resource usage data and user data; receive, from a plurality of distributed computing systems, resource allocation data; convert the resource allocation data and resource usage data to a standardized format; generate, via an artificial intelligence engine, a predicted networked interaction and a success score associated with the networked interaction; determine that the success score is above a predetermined threshold value; automatically generate a message identifying the networked interaction; and transmit the message in real time to at least one distributed computing system of the plurality of distributed computing systems, wherein the at least one distributed computing system is associated with the networked interaction.

20 Claims, 5 Drawing Sheets

(56) References Cited

U.S. PATENT DOCUMENTS

| | | |
|---|---|---|
| 10,891,655 B1 | 1/2021 | Flowers et al. |
| 11,269,908 B2 | 3/2022 | Beringer et al. |
| 11,301,351 B2 | 4/2022 | Bigaj et al. |
| 2002/0120511 A1 | 8/2002 | Hanes |
| 2007/0204223 A1 | 8/2007 | Bartels et al. |
| 2008/0249832 A1 | 10/2008 | Richardson et al. |
| 2010/0191692 A1 | 7/2010 | Gassewitz et al. |
| 2011/0016121 A1 | 1/2011 | Sambrani et al. |
| 2011/0313844 A1 | 12/2011 | Chandramouli et al. |
| 2013/0218905 A1 | 8/2013 | Sankarasubramaniam et al. |
| 2014/0222568 A1 | 8/2014 | Weitzman |
| 2014/0280575 A1 | 9/2014 | Cowan |
| 2015/0254704 A1 | 9/2015 | Kothe et al. |
| 2015/0262245 A1 | 9/2015 | Arvanitis |
| 2016/0182395 A1* | 6/2016 | Parikh ................. G06F 11/3433 709/226 |
| 2017/0339069 A1* | 11/2017 | Larsson ............... G06F 9/5061 |
| 2018/0232766 A1 | 8/2018 | Braunberger |
| 2021/0035128 A1* | 2/2021 | Benkreira .......... G06Q 30/0205 |
| 2021/0081922 A1* | 3/2021 | Wang ...................... G06N 7/01 |
| 2022/0026577 A1* | 1/2022 | Zhang ................... G01S 7/4876 |
| 2022/0215465 A1* | 7/2022 | Mitchko ............. G06Q 20/102 |
| 2022/0245641 A1* | 8/2022 | Wintle ................. G06Q 20/102 |
| 2022/0329539 A1* | 10/2022 | Kim ...................... H04L 41/147 |
| 2022/0366412 A1* | 11/2022 | Mori ..................... G06Q 20/405 |
| 2023/0419291 A1* | 12/2023 | Atkins ................... G06V 20/30 |

\* cited by examiner

REAL-TIME ADJUSTMENT OF RESOURCE ALLOCATION BASED ON USAGE MAPPING VIA AN ARTIFICIAL INTELLIGENCE ENGINE

FIELD OF THE INVENTION

The present invention embraces a system for real-time adjustment of resource allocation based on usage mapping via an artificial intelligence engine.

BACKGROUND

In conventional resource allocation systems, resource usage is not monitored after allocation. This creates system inefficiencies, where resources are allocated to systems or users that have little or no need for said resources. As such, there is a need for a system for real-time adjustment of resource allocation based on usage mapping.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for real-time adjustment of resource allocation is presented. The system may include at least one non-transitory storage device and at least one processor coupled to the at least one non-transitory storage device, where the at least one processor is configured to: receive a data transmission from a plurality of user devices, wherein the data transmission comprises resource usage data and user data; receive, from a plurality of distributed computing systems, resource allocation data; convert the resource allocation data and resource usage data to a standardized format; generate, via an artificial intelligence engine, a predicted networked interaction and a success score associated with the networked interaction; determine that the success score is above a predetermined threshold value; automatically generate a message identifying the networked interaction; and transmit the message in real time to at least one distributed computing system of the plurality of distributed computing systems, wherein the at least one distributed computing system is associated with the networked interaction.

In some embodiments, each distributed computing system of the plurality of distributed computing systems is associated with a merchant system.

In some embodiments, the resource allocation data includes information identifying a resource allocation from a first distributed computing system of the plurality of distributed computing systems to a first user, the first user being associated with a first user device of the plurality of user devices.

In some embodiments, the resource usage data includes information associating a resource usage with the resource allocation.

In some embodiments, the system further includes providing remote access, via a network, to the plurality of distributed computing systems and receiving, from a second distributed computing system of the plurality of distributed computing systems, potential resource allocation data.

In some embodiments, the system further includes determining, via the artificial intelligence engine, a success score associated with the potential resource allocation data; automatically generating a message containing the success score associated with the potential resource allocation data; and transmitting the message in real time to the second distributed computing system.

In some embodiments, receiving, from the plurality of user devices, resource usage data further includes automatically receiving, from the plurality of user devices, updated resource usage data based on a predetermined parameter.

In some embodiments, the networked interaction is at least one of a resource allocation, a computer-generated message, and a third-party resource allocation.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
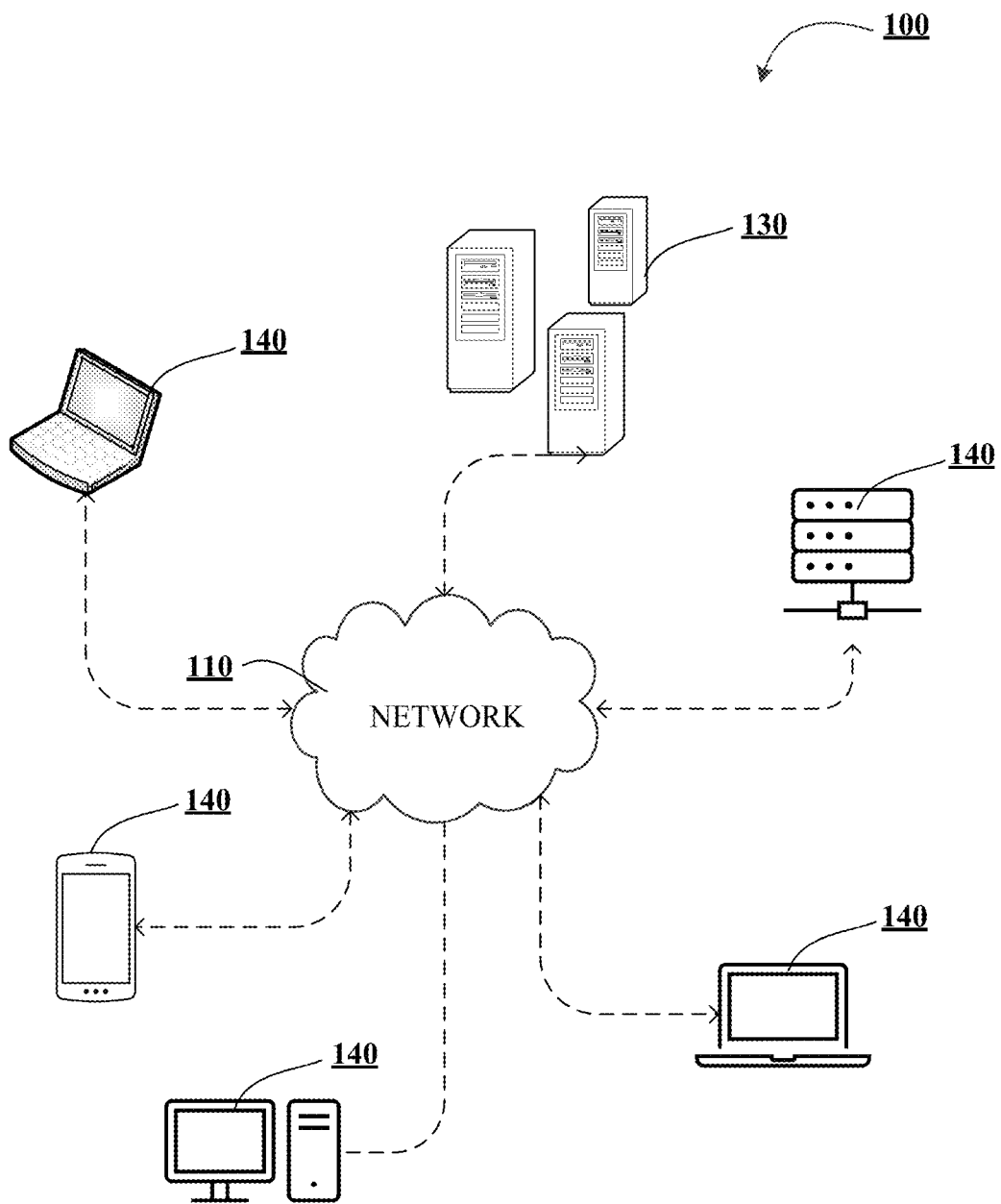
Figure 1B:
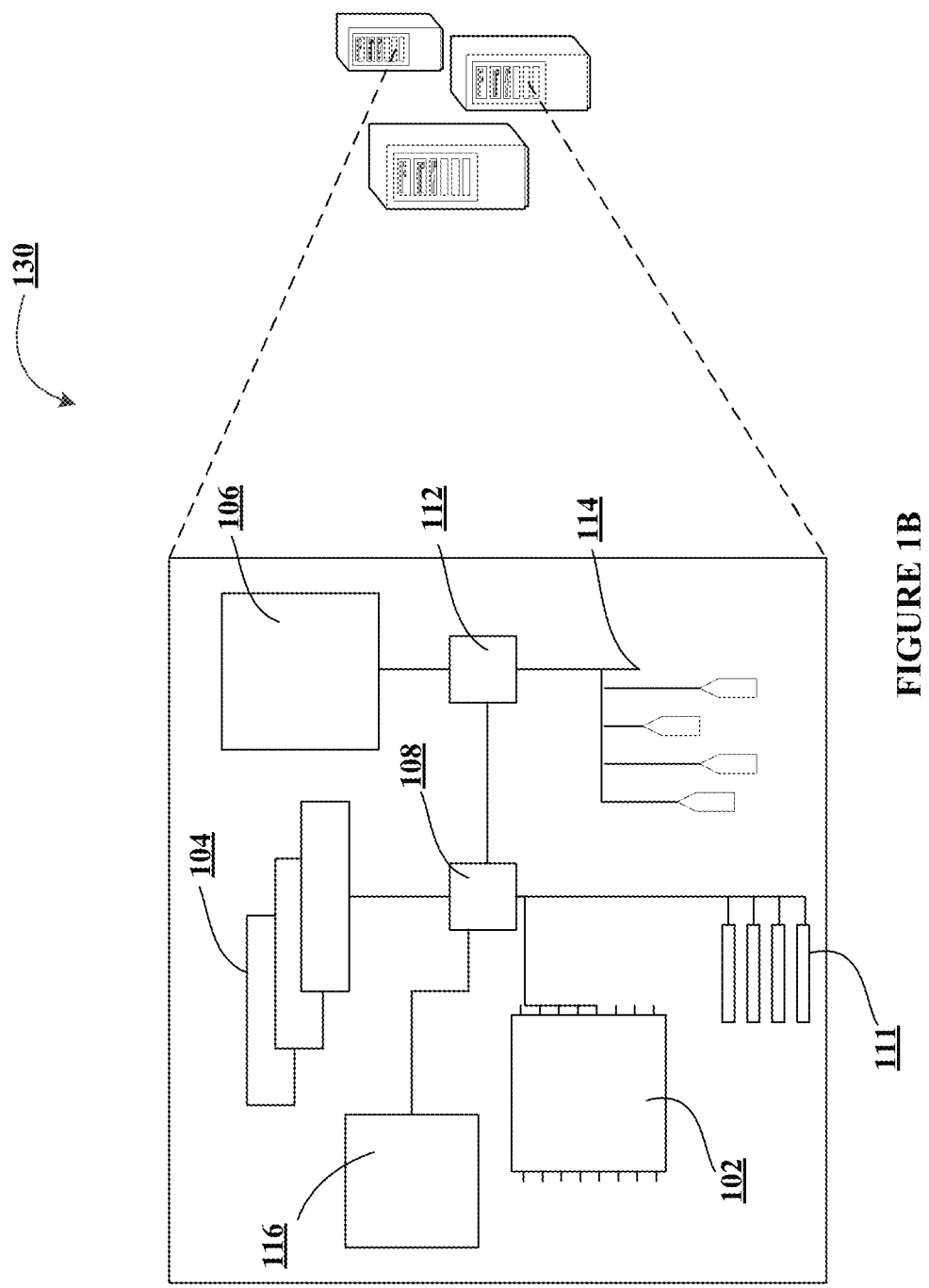
Figure 1C:
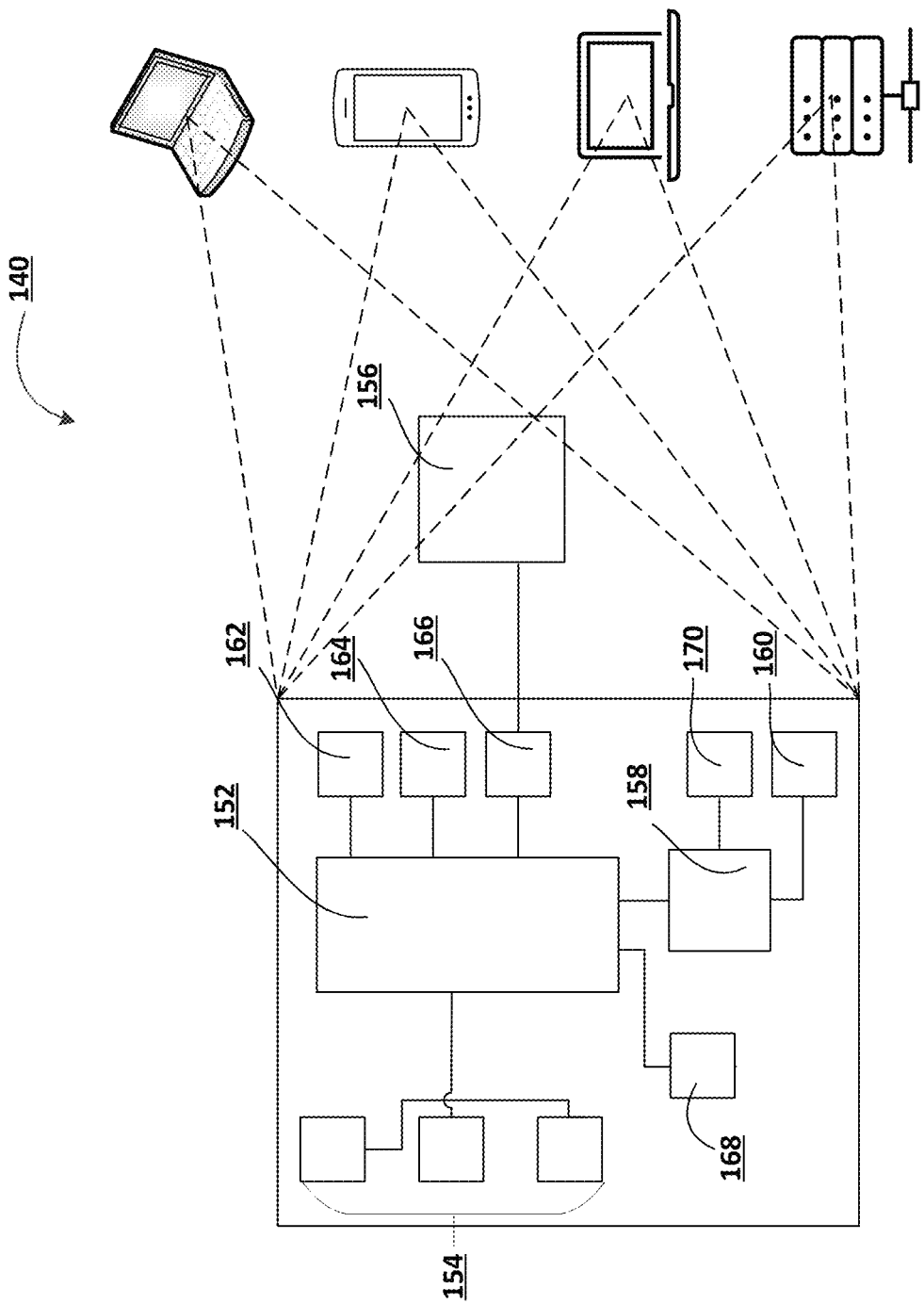
Figure 2:
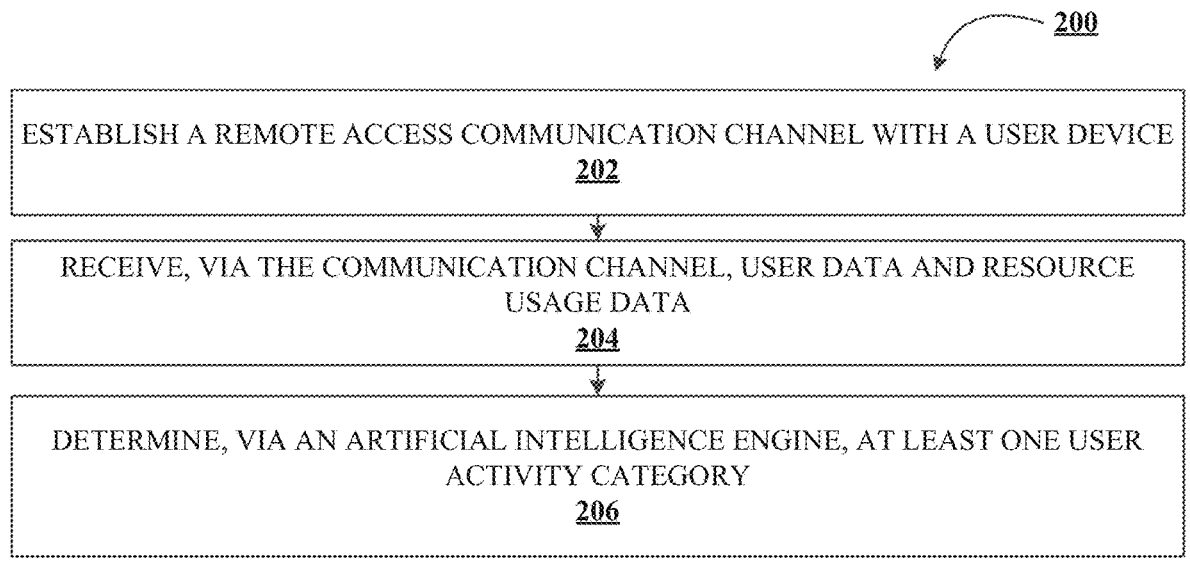
Figure 3:
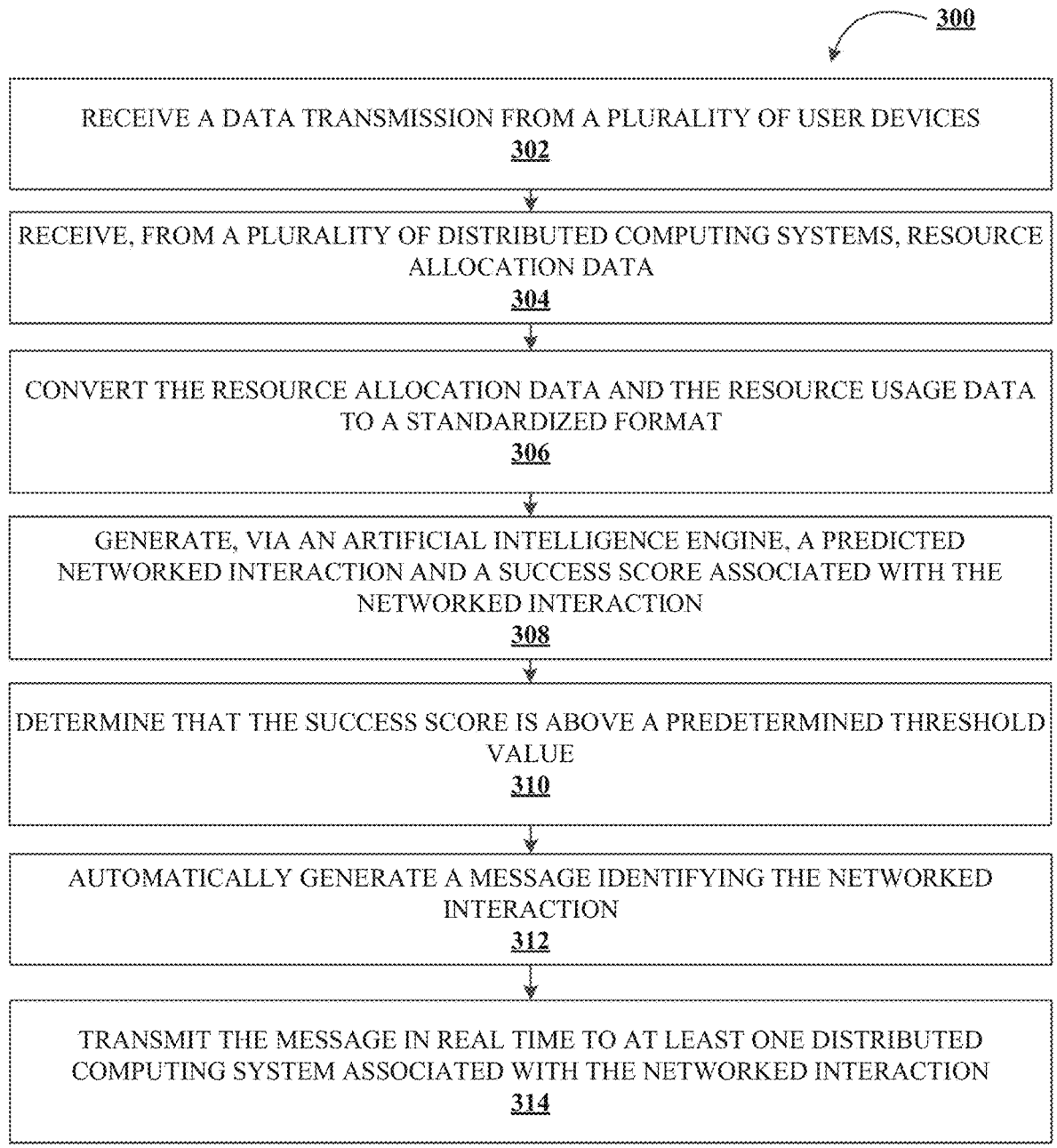

Having thus described embodiments of the invention in general terms, reference will now be made the accompanying drawings, wherein:

FIGS. 1A-1C illustrate technical components of an exemplary distributed computing environment for real-time adjustment of resource allocation, in accordance with an embodiment of the invention;

FIG. 2 illustrates a process flow for real-time adjustment of resource allocation, in accordance with an embodiment of the invention; and FIG. 3 illustrates a process flow for real-time adjustment of resource allocation, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this invention, a resource is typically stored in a resource repository—a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

The system allows for use of a machine learning engine to map resource usage across a distributed network of computing systems and therefore predict future resource usage associated with said computing systems. A managing entity such as a financial institution may facilitate resource allocations between a large plurality of users and merchants. By collecting data associated with each resource allocation, the system may identify data trends and generate predictions of future resource usage by the plurality of users. In this way, the system may benefit a number of merchants, as well as managing entities, by providing resource allocation insights and data analysis that would not be obtainable by any one entity operating alone.

The system may enable, based on a usage map, a managing entity to recommend that a merchant offer a user a reward resource allocation, such as a discount or cash reward. As an example, the system may determine that after a user receives a cash reward from a merchant, the user is highly likely to spend the cash reward on a product or service from the same merchant. The features and functions of the system will allow a managing entity to notify both the merchant and similar merchants of this trend, enabling all notified merchants to provide targeted resource allocation to similar users at appropriate times. Additionally or alternatively, the system may employ data from a variety of sources to further refine usage maps, including but not limited to location-based service data and data captured during user/managing entity interactions other than resource allocations, such as user activity in an application hosted by the managing entity.

Accordingly, the present invention is configured to receive, from a plurality of distributed computing systems, resource allocation data; receive, from a plurality of user devices, resource usage data; convert the resource allocation data and resource usage data to a standardized format; generate, via an artificial intelligence engine, a predicted resource allocation and a success score associated with the predicted resource allocation; determine that the success score is above a predetermined threshold value; automatically generate a message containing the predicted resource allocation; and transmit the message in real time to at least one distributed computing system of the plurality of distributed computing systems, wherein the at least one distributed computing system is associated with the predicted resource allocation.

What is more, the present invention provides a technical solution to a technical problem. As described herein, the technical problem includes an inability for distributed computing systems to monitor usage of allocated resources after distribution to a user device. The technical solution presented herein allows for distributed computing systems to share resource usage information in real time in a standardized format regardless of the method by which a particular computing system interacted with a user device. In particular, the real-time usage mapping of resource allocations is an improvement over existing solutions to the problem of lack of visibility into resource usage by distributed computing systems by providing a more accurate solution to the problem, thus reducing the number of resources required to remedy any errors made due to a less accurate solution. In addition, the present invention removes manual input and waste from the implementation of the solution, thus improving speed and efficiency of the process and conserving computing resources. Furthermore, the present invention determines an optimal amount of resources that need to be used to implement the solution, thus reducing network traffic and load on existing computing resources. Finally, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for real-time adjustment of resource allocation 100, in accordance with an embodiment of the invention. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow for a system for real-time adjustment of resource allocation, in accordance with an embodiment of the present invention. The process may begin in block 202, where the system may establish a remote access communication channel with a user device. The system may establish said communication channel in response to receiving a request from the user device. Additionally or alternatively, the system may transmit a request for remote access to the user device, and the communication channel may be established in response to a user acceptance of the request. In some embodiments, the request from the user device and/or the request for remote access may be visually displayed to the user via a user interface of a software application installed on the user device. The software application may be associated with a managing entity system and/or a merchant system.

The process flow may then continue to block 204, where the system may receive, via the communication channel, user data and resource usage data from the user device. User data may include information identifying the user, historical user activity information, user device information, location information, and/or the like. In some embodiments, the system may receive user data in response to a request sent by the system. Additionally or alternatively, the system may regularly receive user data in intervals such as weekly, daily, and/or the like.

The process flow may then continue to block 206, where the system may determine, via an artificial intelligence engine, at least one user activity category. The features and functions of the artificial intelligence engine are discussed in greater detail with respect to FIG. 3. In some embodiments, the user activity category may be based on the user data, resource usage data, and/or a combination of the user data and the resource usage data. For example, the artificial intelligence engine may determine, based on a combination of location information and historical user activity, that a user falls within a predetermined "frequent traveler" category. In another example, the artificial intelligence engine may determine, based on user device information and resource usage data, that a user falls within a predetermined category of "technology enthusiast." In some embodiments, the system and/or a merchant system may define a predetermined set of user activity categories. Additionally or alternatively, the artificial intelligence system may generate user activity categories subject to a set of parameters established by the system and/or merchant system.

In some embodiments, the system may establish communication channels with a plurality of distributed computing systems, or merchant systems, such that any merchant system is able to query the system for users of a particular category. Additionally or alternatively, the system may associate particular merchant systems with particular categories, and may transmit a notification to said merchant systems whenever new users are added to the associated categories.

FIG. 3 illustrates a process flow for a system for real-time adjustment of resource allocation, in accordance with an embodiment of the present invention. The process may begin in block 302, where the system receives, from a plurality of user devices, a data transmission. The data transmission may comprise user data and/or resource usage data. The resource usage data may comprise information associating a resource usage with a resource allocation. For example, in embodiments wherein a resource allocation is a cash reward, the resource usage data may identify a resource transfer associated with the cash reward (e.g. an associated merchant system, a resource transfer amount, a timestamp, etc.). In some embodiments, the resource usage data may indicate that there has not been a resource transfer associated with the resource allocation, or that the resource allocation has expired. In some embodiments, the system may automatically receive updated resource usage data based on a predetermined parameter, such as daily or hourly updates. Additionally or alternatively, the system may automatically receive updated resource usage data in real time as resource allocations are involved in resource transfers or as resource allocations expire.

The process flow may then continue to block 304, where the system receives, from a plurality of distributed computing systems, resource allocation data. Each distributed computing system of the plurality of distributed computing systems may associated with a merchant system. In some embodiments, the resource allocation data may comprise information identifying a resource allocation from a first distributed computing system of the plurality of distributed computing systems to a first user. The first user may be associated with a first user device. For example, the resource allocation may identify a transmission of a discount or coupon from a merchant system to a user, or a user device associated with the user. In another example, the resource allocation may identify a transmission of a cash reward to a user or an associated user device. The resource allocation data may comprise additional identifying information such as time, location, user information, merchant information, and information associated with any parameters of the resource allocation, such as an expiration date. In some embodiments, the system may be further configured to receive data from a plurality of third-party systems. For example, the system may identify that a distributed computing system is located in a particular city. The system may then be configured to access a local calendar of events occurring in said city.

The process flow may then continue to block 306, where the system converts the resource allocation data and resource usage data to a standardized format. For example, the system may assign resource allocation data to a plurality of categories (e.g. coupons, cash rewards, vouchers, and/or other benefits) and may convert a resource allocation to a standard value (i.e. converting numerical values into percentage values, etc.). Additionally or alternatively, the system may assign resource usage data to a plurality of categories (e.g. expiration, transfer to a secondary user, redemption at the original merchant system, redemption at a different merchant system, and/or the like). The system may also convert a resource usage to a standard value (i.e. converting numerical values into percentage values, etc.). The system may also determine a user activity category as is discussed in greater detail with respect to FIG. 2, and/or may identify previously determined user activity categories associated with the plurality of user devices.

The process flow may then continue to block 308, where the system generates, via an artificial intelligence engine, a predicted networked interaction and a success score associated with the predicted networked interaction. The artificial intelligence engine may generate predicted networked interactions and success scores based on a user activity category, data from one or more third party systems, and a variety of machine learning algorithms. The artificial intelligence engine may be trained via a set of predetermined parameters provided by the system and/or a merchant system. The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like. In an exemplary embodiment, the system may utilize the artificial intelligence engine to predict that a particular merchant system will transmit a coupon to a user device in an upcoming transaction. The user device may be associated with a particular location or other identifying characteristic. The system may further utilize the artificial intelligence engine to determine that the user associated with the user device is unlikely to redeem the coupon during a subsequent transaction with the merchant system. The system may also utilize the artificial intelligence system to predict that if the same merchant system transmitted the coupon to a second user device located in a different location, the user associated with the second user device is much more likely to redeem the coupon during a subsequent transaction with the merchant system. A networked interaction may include a resource allocation (e.g. a coupon, voucher, discount, and/or the like), a computer-generated message (i.e. a notification, email, electronic post, and/or the like), and/or a third party resource allocation (i.e. a donation, a transferrable resource, a referral code, and/or the like.)

The process flow may then continue to block 310, where the system determines that the success score is above a predetermined threshold value. The predetermined threshold may be a binary value such as 0 or 1 or may reflect a confidence percentage of the artificial intelligence engine. In some embodiments, the predetermined threshold value may vary by merchant system, by resource allocation category, or by networked interaction type and may be determined by the system or by an individual merchant system.

The process flow may then continue to block 312, where the system automatically generates a message identifying the predicted networked interaction. For example, the message may contain a description of a predicted networked interaction as well as information identifying the user, user type, user device, and/or user device type identified in the predicted networked interaction. The message may further contain the success score or information associated with the success score. For example, the system may generate a message identifying a plurality of users with a particular resource usage history. The message may further contain information instructing the merchant system that if the plurality of users were provided with a resource allocation, the users are highly likely to utilize the resource allocation.

The process flow may then continue to block 314, where the system transmits the message in real time to at least one distributed computing system, or merchant system, of the plurality of distributed computing systems. The at least one distributed computing system or merchant system may be associated with the predicted networked interaction. For example, the system may transmit the message to all merchant systems of a particular type or in a particular location.

In some embodiments, the system may further be configured to provide remote access, via a network, to the plurality of distributed computing systems. In said embodiments, the system may be configured to receive potential resource allocation data from a distributed computing system. For example, a particular distributed computing system, or merchant system, may upload or input an upcoming resource allocation (e.g. an upcoming promotion or reward). The system may then determine, via the artificial intelligence engine, a success score associated with the potential resource allocation data. The system may then automatically generate a message containing the success score associated with the potential resource allocation data and transmit the message in real time to the particular distributed computing system. In this way, merchant systems may utilize the features and functions of the system to proactively test potential resource allocation strategies.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for real-time adjustment of resource allocation, the system comprising:
   at least one non-transitory storage device; and
   at least one processor coupled to the at least one non-transitory storage device, wherein the at least one processor is configured to:
   establish a wireless communication channel with a plurality of smartphones via an application installed on each of the plurality of smartphones, wherein the application is associated with a particular managing entity and comprises a user interface;
   receive a data transmission from the plurality of smartphones, wherein the data transmission comprises resource usage data and user data, the user data further comprising historical user purchasing data;
   receive, from a plurality of distributed computing systems, resource allocation data;
   convert the resource allocation data and resource usage data to a standardized format;
   generate, via an artificial intelligence engine, a predicted networked interaction and a success score associated with the networked interaction;
   determine that the success score is above a predetermined threshold value;
   automatically generate a message identifying the predicted networked interaction; and
   transmit the message in real time to at least one distributed computing system of the plurality of distributed computing systems, wherein the at least one distributed computing system is associated with the predicted networked interaction.

2. The system of claim 1, wherein each distributed computing system of the plurality of distributed computing systems is associated with a merchant system.

3. The system of claim 1, wherein the resource allocation data comprises information identifying a resource allocation from a first distributed computing system of the plurality of distributed computing systems to a first user, the first user being associated with a first smartphone of the plurality of smartphones.

4. The system of claim 3, wherein the resource usage data comprises information associating a resource usage with the resource allocation.

5. The system of claim 1, wherein the at least one processor is further configured to:
   provide remote access, via a network, to the plurality of distributed computing systems; and receive, from a second distributed computing system of the plurality of distributed computing systems, potential resource allocation data.

6. The system of claim 5, wherein the at least one processor is further configured to:
determine, via the artificial intelligence engine, a success score associated with the potential resource allocation data;
automatically generate a message containing the success score associated with the potential resource allocation data; and
transmit the message in real time to the second distributed computing system.

7. The system of claim 1, wherein receiving, from the plurality of smartphones, resource usage data further comprises automatically receiving, from the plurality of smartphones, updated resource usage data based on a predetermined parameter.

8. The system of claim 1, wherein the predicted networked interaction is at least one of a resource allocation, a computer-generated message, and a third-party resource allocation.

9. A computer program product for real-time adjustment of resource allocation, the computer program product comprising a non-transitory computer-readable medium comprising code causing an apparatus to:
establish a wireless communication channel with a plurality of smartphones via an application installed on each of the plurality of smartphones, wherein the application is associated with a particular managing entity and comprises a user interface;
receive a data transmission from the plurality of smartphones, wherein the data transmission comprises resource usage data and user data, the user data further comprising historical user purchasing data;
receive, from a plurality of distributed computing systems, resource allocation data;
convert the resource allocation data and resource usage data to a standardized format;
generate, via an artificial intelligence engine, a predicted networked interaction and a success score associated with the predicted networked interaction;
determine that the success score is above a predetermined threshold value;
automatically generate a message identifying the predicted networked interaction; and
transmit the message in real time to at least one distributed computing system of the plurality of distributed computing systems, wherein the at least one distributed computing system is associated with the predicted networked interaction.

10. The computer program product of claim 9, wherein each distributed computing system of the plurality of distributed computing systems is associated with a merchant system.

11. The computer program product of claim 9, wherein the resource allocation data comprises information identifying a resource allocation from a first distributed computing system of the plurality of distributed computing systems to a first user, the first smartphone of the plurality of smartphones.

12. The computer program product of claim 11, wherein the resource usage data comprises information associating a resource usage with the resource allocation.

13. The computer program product of claim 9, wherein the apparatus is further configured to:
provide remote access, via a network, to the plurality of distributed computing systems; and
receive, from a second distributed computing system of the plurality of distributed computing systems, potential resource allocation data.

14. The computer program product of claim 13, wherein the apparatus is further configured to:
determine, via the artificial intelligence engine, a success score associated with the potential resource allocation data;
automatically generate a message containing the success score associated with the potential resource allocation data; and
transmit the message in real time to the second distributed computing system.

15. The computer program product of claim 9, wherein receiving, from the plurality of smartphones, resource usage data further comprises automatically receiving, from the plurality of smartphones, updated resource usage data based on a predetermined parameter.

16. The computer program product of claim 9, wherein the predicted networked interaction is at least one of a resource allocation, a computer-generated message, and a third-party resource allocation.

17. A method for real-time adjustment of resource allocation, the method comprising:
establishing a wireless communication channel with a plurality of smartphones via an application installed on each of the plurality of smartphones, wherein the application is associated with a particular managing entity and comprises a user interface;
receiving a data transmission from the plurality of smartphones, wherein the data transmission comprises resource usage data and user data, the user data further comprising historical user purchasing data;
receiving, from a plurality of distributed computing systems, resource allocation data;
converting the resource allocation data and resource usage data to a standardized format;
generating, via an artificial intelligence engine, a predicted networked interaction and a success score associated with the predicted networked interaction;
determining that the success score is above a predetermined threshold value;
automatically generating a message identifying the predicted networked interaction; and
transmitting the message in real time to at least one distributed computing system of the plurality of distributed computing systems, wherein the at least one distributed computing system is associated with the predicted networked interaction.

18. The method of claim 17, wherein the resource allocation data comprises information identifying a resource allocation from a first distributed computing system of the plurality of distributed computing systems to a first user, the first user being associated with a first smartphone of the plurality of smartphones.

19. The method of claim 18, wherein the resource usage data comprises information associating a resource usage with the resource allocation.

20. The method of claim 17, wherein the method further comprises:
providing remote access, via a network, to the plurality of distributed computing systems;
receiving, from a second distributed computing system of the plurality of distributed computing systems, potential resource allocation data;

determining, via the artificial intelligence engine, a success score associated with the potential resource allocation data;
automatically generating a message containing the success score associated with the potential resource allocation data; and
transmitting the message in real time to the second distributed computing system.

\* \* \* \* \*